(12) United States Patent
Liu et al.

(10) Patent No.: US 10,343,287 B2
(45) Date of Patent: Jul. 9, 2019

(54) ROBOT VOICE DIRECTION-SEEKING TURNING SYSTEM AND METHOD

(71) Applicant: YUTOU TECHNOLOGY (HANGZHOU) CO., LTD., Wuchang Sub-District, Yuhang District Hangzhou, Zhejiang (CN)

(72) Inventors: Xin Liu, Zhejiang (CN); Peng Gao, Zhejiang (CN); Lichun Fan, Zhejiang (CN); Jiaqi Shi, Zhejiang (CN); Peng Cai, Zhejiang (CN); Mingjun Cai, Zhejiang (CN)

(73) Assignee: YUTOU TECHNOLOGY (HANGZHOU) CO., LTD., Zhejiang (CN)

(*) Notice: Subject to any disclaimer, the term of this patent is extended or adjusted under 35 U.S.C. 154(b) by 0 days.

(21) Appl. No.: 15/739,330

(22) PCT Filed: Jun. 14, 2016

(86) PCT No.: PCT/CN2016/085761
§ 371 (c)(1),
(2) Date: Jan. 3, 2018

(87) PCT Pub. No.: WO2017/000775
PCT Pub. Date: Jan. 5, 2017

(65) Prior Publication Data
US 2018/0186009 A1  Jul. 5, 2018

(30) Foreign Application Priority Data

Jun. 30, 2015 (CN) .......................... 2015 1 0388319

(51) Int. Cl.
*B25J 9/16* (2006.01)
*H04R 1/02* (2006.01)
(Continued)

(52) U.S. Cl.
CPC .......... *B25J 13/003* (2013.01); *B25J 9/1656* (2013.01); *B25J 9/1694* (2013.01); *G10L 15/22* (2013.01);
(Continued)

(58) Field of Classification Search
CPC ...... B25J 13/003; B25J 9/1656; B25J 9/1694; G10L 15/22; G10L 25/84;
(Continued)

(56) References Cited

U.S. PATENT DOCUMENTS

2010/0034397 A1   2/2010   Nakadai et al.

FOREIGN PATENT DOCUMENTS

| CN | 102305925 | 1/2012 |
| CN | 103064061 | 4/2013 |

(Continued)

OTHER PUBLICATIONS

PCT/CN2016/085761, International Search Report and Written Opinion dated Sep. 11, 2016, 5 pages—English, 6 pages—Chinese.

*Primary Examiner* — Quynh H Nguyen
(74) *Attorney, Agent, or Firm* — Andrew F. Young, Esq.; Lackenbach Siegel, LLP

(57) ABSTRACT

A robot voice direction-seeking turning system and method. The robot voice direction-seeking turning system employs a voice activity detection unit (1) that detects a received voice signal to determine whether or not a voice signal transmitted by a user (S2) is present; a direction-seeking angle for the voice signal is calculated by a voice direction-seeking unit (3), and a voice direction-seeking turning unit (4) is employed to drive a robot to turn towards the direction of the sound source of the voice signal on the basis of a direction-seeking angle (S4). Employment of the robot voice direction-seeking turning method allows accurate acquisition of a
(Continued)

Figure 1:
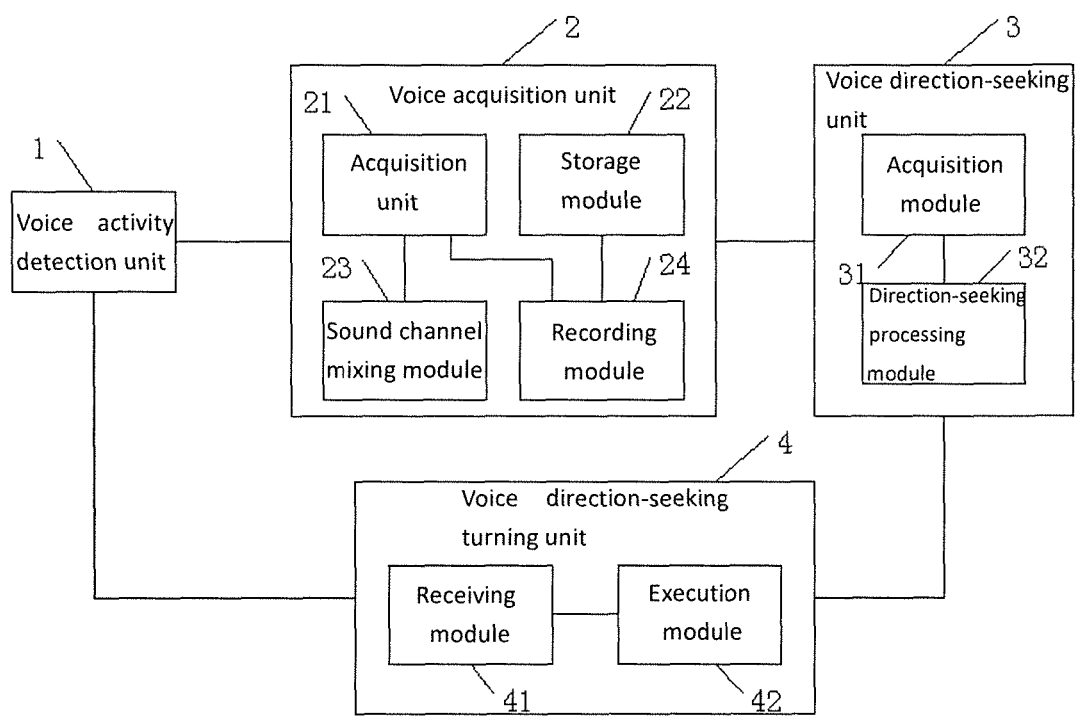

valid voice signal transmitted by the user, thus increasing signal-to-noise ratio and the accuracy of voice recognition.

7 Claims, 2 Drawing Sheets

(51) Int. Cl.
    *H04R 1/40*     (2006.01)
    *H04R 3/00*     (2006.01)
    *B25J 13/00*     (2006.01)
    *G10L 15/22*     (2006.01)
    *G10L 25/84*     (2013.01)
    *H04R 5/027*     (2006.01)

(52) U.S. Cl.
    CPC .............. *G10L 25/84* (2013.01); *H04R 3/005* (2013.01); *H04R 5/027* (2013.01); *G10L 2015/223* (2013.01); *H04R 1/028* (2013.01); *H04R 1/406* (2013.01); *Y10S 901/46* (2013.01)

(58) Field of Classification Search
    CPC ... G10L 2015/223; H04R 1/406; H04R 3/005; H04R 5/027; Y10S 901/46
    USPC .......................................................... 704/233
    See application file for complete search history.

(56) References Cited

FOREIGN PATENT DOCUMENTS

| | | |
|---|---|---|
| CN | 103308889 | 9/2013 |
| CN | 104459625 | 3/2015 |

ROBOT VOICE DIRECTION-SEEKING TURNING SYSTEM AND METHOD

CROSS-REFERENCE TO RELATED APPLICATIONS

The present application claims priority to and the benefit of PCT/CN2016/085761 filed Jun. 14, 2016, the entire contents of which are incorporated herein by reference which in turn claims priority to Chinese Patent Application No. CN 201510388219.8 filed Jun. 30, 2015.

BACKGROUND OF THE INVENTION

1. Field of the Invention

The invention relates to the field of audio recognition, and more particularly, to a robot voice direction-seeking turning system and method.

2. Description of the Related Art

Sound source localization technology is a technology that receives target sound field information by using acoustic and electronic devices to determine the location of the sound source. The existing sound source localization technology in a robot system is still limited to the location of the sound source with higher energy value, but not for the location of voice of a user. Therefore, the sound source localization technology will be easily interrupted by the surrounding noise, and the robot will turn to left and right after making a mistake in the judgment of direction, moreover, such an interruption will make it hard for a microphone array beam to point at the user who is talking, reducing the signal-to-noise ratio while the microphone array picks up voice, thus having a certain impact on the user experience about voice recognition.

SUMMARY OF THE INVENTION

Given that the foregoing problems exist in the existing sound source localization technology, the present invention provides a robot voice direction-seeking turning system and method intended to find out the direction of the user's voice, to drive the robot to turn to the direction of the user who is talking, thus increasing the accuracy of voice recognition and signal-to-noise ratio.

The detailed technical schemes are as follows:

a robot voice direction-seeking turning system, comprising:

a voice acquisition unit, for collecting a sound signal and store the collected sound signal;

a voice activity detection unit, connecting to the voice acquisition unit, for detecting whether a voice signal is present in the sound signal, and outputting the detection result;

a voice direction-seeking turning unit, connecting to the voice activity detection unit, when the detection result indicating that the voice signal is present in the sound signal, controlling the voice acquisition unit to obtain location information corresponding to the sound signal, and outputting the location information; and a voice direction-seeking unit, connecting to the voice acquisition unit and the voice direction-seeking turning unit respectively, for extracting the sound signal corresponding to the location information based on the location information, and performing calculation based on the sound signal corresponding to the location information, to obtain a direction-seeking angle, and outputting the direction-seeking angle.

Preferably, wherein the voice acquisition unit comprises: an acquisition device, a recording module and a storage module;

wherein, the acquisition device is configured to collect the sound signal, and output the sound signal;

wherein, the recoding module is connecting to the acquisition device and the storage module respectively, for storing the collected sound signal in the storage module.

Preferably, wherein the voice acquisition unit further comprises:

a sound channel mixing module, connecting to the acquisition device, for mixing a left sound channel signal with a right sound channel signal in the sound signal to generate a mixed sound information, and outputting the mixed sound information.

Preferably, wherein the voice direction-seeking turning unit comprises:

a receiving module, for receiving the detection result, the location information and the direction-seeking angle;

wherein, when the detection result indicates that the voice signal is present in the sound signal, controlling the voice acquisition unit to obtain the location information of the sound signal, and sending the location information to the voice direction-seeking unit, then obtaining the direction-seeking angle through the voice direction-seeking unit; and a execution unit, connecting to the receiving module, for driving the robot to turn a main interface thereon to a direction of the sound signal based on the direction-seeking angle.

Preferably, wherein the voice direction-seeking unit comprises:

an acquisition module, for acquiring the left sound channel signal and the right sound channel signal of the sound signal from the voice acquisition unit based on the location information, the sound signal being corresponding to the location information.

Preferably, wherein the voice direction-seeking unit further comprises:

a direction-seeking processing module, connecting to the acquisition module, for performing calculation based on the left sound channel signal and right sound channel signal in the sound signal to obtain the direction-seeking angle in the direction of the sound source.

Preferably, wherein an array microphone is adopted as the acquisition device for converting a picked-up analog voice signal into a digital sound signal, and outputting the digital sound signal.

A robot voice direction-seeking turning method, applicable to the robot voice direction-seeking turning system, comprising the following steps of:

S1. acquiring and storing the sound signal;

S2. detecting whether a voice signal is present in the sound signal, if yes, executing Step S3, if not, executing Step S1;

S3. acquiring the location information of the sound signal;

S4. extracting the sound signal corresponding to the location information based on the location information, and performing calculation based on the sound signal corresponding to the location information, to obtain the direction-seeking angle;

S5. driving the robot to turn a main interface thereon to the direction of the sound signal based on the direction-seeking angle.

The beneficial effects of the above technical schemes are listed below:

in the present schemes, The robot voice direction-seeking turning system employs a voice activity detection unit that detects a received sound signal to determine whether a voice signal transmitted by a user is present in the received sound signal, thus increasing the accuracy of voice recognition; a direction-seeking angle for the voice signal is calculated by a voice direction-seeking unit, and a voice direction-seeking turning unit is employed to drive a robot to turn to the direction of the sound source of the voice signal based on the direction-seeking angle, thus increasing the accuracy of voice recognition and signal-to-noise ratio. Employment of the robot voice direction-seeking turning method allows accurate acquisition of a valid voice signal transmitted by a valid user, thus increasing signal-to-noise ratio and the accuracy of voice recognition.

BRIEF DESCRIPTIONS OF THE DRAWINGS

The accompanying drawings, together with the specification, illustrate exemplary embodiments of the present disclosure, and, together with the description, serve to explain the principles of the present invention.

FIG. 1 is a block diagram of an embodiment of a robot voice direction-seeking turning system of the present invention;

Figure is a flowchart of a robot voice direction-seeking turning method of the present invention.

DETAILED DESCRIPTION

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "plurality" means a number greater than one.

Hereinafter, certain exemplary embodiments according to the present disclosure will be described with reference to the accompanying drawings.

A robot voice direction-seeking turning system as shown in FIG. 1, comprising:

a voice acquisition unit 2, for collecting a sound signal and store the collected sound signal;

a voice activity detection unit 1, connecting to the voice acquisition unit 2, for detecting whether a voice signal is present in the sound signal, and outputting the detection result;

a voice direction-seeking turning unit 4, connecting to the voice activity detection unit 1, when the detection result indicating that the voice signal is present in the sound signal, controlling the voice acquisition unit 2 to obtain location information corresponding to the sound signal, and outputting the location information; and a voice direction-seeking unit 3, connecting to the voice acquisition unit 2 and the voice direction-seeking turning unit 4 respectively, for extracting the sound signal corresponding to the location information based on the location information, and performing calculation based on the sound signal corresponding to the location information, to obtain a direction-seeking angle, and outputting the direction-seeking angle.

Further, the sound signal may comprise noise from the outside and a voice signal of a user who is talking. The robot voice direction-seeking turning system employs the voice activity detection unit 1 to detect a received signal, when a voice signal is present in the sound signal, obtaining the sound signal's location information in the voice acquisition unit, and sending the location information to the voice-seeking unit 3 for direction-seeking.

In this embodiment, the robot voice direction-seeking turning system employs the voice activity detection unit 1 that detects a received voice signal to determine whether a voice signal transmitted by a user is present in the received sound signal, thus increasing the accuracy of voice recognition; a direction-seeking angle for the voice signal is calculated by a voice direction-seeking unit 3, and a voice direction-seeking turning unit 4 is employed to drive a robot to turn to the direction of the sound source of the voice signal based on the direction-seeking angle, thus increasing the accuracy of voice recognition and signal-to-noise ratio. The voice activity detection unit 1 in the embodiment is a prior art with regard to the voice signal detection, and details about the acquisition of the voice signal will be omitted herein.

In a preferred embodiment, wherein the voice acquisition unit 2 comprises: an acquisition device 21, a recording module 24 and a storage module 22;

wherein, the acquisition device 21 is configured to collect the sound signal, and output the sound signal;

wherein, the recoding module 24 is connecting to the acquisition device 21 and the storage module 22 respectively, for storing the collected sound signal in the storage module 22.

In a preferred embodiment, wherein the voice acquisition unit 2 further comprises:

a sound channel mixing module 23, connecting to the acquisition device 21, for mixing a left sound channel signal with a right sound channel signal in the sound signal to generate a mixed sound information, and outputting the mixed sound information.

In this embodiment, the sound channel mixing module 23 is employed to mix the left sound channel signal with the right sound channel signal outputted by the acquisition device 21 and output the mixed sound channel signal.

In a preferred embodiment, wherein the voice direction-seeking turning unit 4 comprises:

a receiving module 41, for receiving the detection result, the location information and the direction-seeking angle;

wherein, when the detection result indicates that the voice signal is present in the sound signal, controlling the voice acquisition unit 2 to obtain the location information of the sound signal, and sending the location information to the voice direction-seeking unit 3, then obtaining the direction-seeking angle through the voice direction-seeking unit 3; and a execution unit 42, connecting to the receiving module 41, for driving the robot to turn a main interface thereon to a direction of the standard sound signal based on the direction-seeking angle.

In this embodiment, when the detection result outputted by the voice activity detection unit 1 indicates that the voice signal is present in the sound signal, obtaining the location information corresponding to the sound signal and send out a notification event, and triggering the voice direction-seeking unit 3 to extract the sound signal corresponding to the location information from the voice acquisition unit 2, to obtain a direction-seeking angle by calculation; when the detection result outputted by the voice activity detection unit 1 indicates that the voice signal is not present in the sound signal, the voice direction-seeking unit 3 is in a standby mode, and the voice activity detection unit 1 is in a state where the voice signal is being detected.

In a preferred embodiment, wherein the voice direction-seeking unit 3 comprises:

an acquisition module 31, for acquiring the left sound channel signal and the right sound channel signal of the sound signal from the voice acquisition unit based on the location information, the sound signal being corresponding to the location information.

In this embodiment, the sound signal corresponding to the location information is extracted from the voice acquisition unit 2 by the acquisition module 31, and accurate direction-seeking angle is obtained based on the sound signal, thus increasing the accuracy of direction-seeking.

In a preferred embodiment, wherein the voice direction-seeking unit 3 further comprises:

a direction-seeking processing module 32, connecting to the acquisition module 31, for performing calculation based on the left sound channel signal and right sound channel signal in the sound signal to obtain the direction-seeking angle in the direction of the sound source.

In this embodiment, calculation is performed through the voice direction-seeking algorithm SO library in the direction-seeking processing module 32 to obtain the direction-seeking angel in the direction of the sound source.

In a preferred embodiment, wherein an array microphone is adopted as the acquisition device 21 for converting a picked-up analog voice signal into the digital sound signal, and outputting the digital sound signal.

The array microphone in this embodiment is configured to pick up a sound signal, analyze and process the sound signal from many sound sources to obtain the location of the sound source, and the execution module 42 can drive the array microphone to turn to the user who is talking, thus improving the anti-noise ability of voice direction-seeking.

The robot voice direction-seeking system provided in this embodiment achieves positioning of the user who is talking, and subsequently turns the main interface of the robot to make the microphone array beam point at the user who is talking. After obtaining the voice signal from the voice acquisition unit 2, the robot voice direction-seeking system employs the voice activity detection unit 1 that detects the sound signal to determine whether a voice signal is present in the sound signal. When the voice signal is present in the sound signal, sending out a notification event to the voice direction-seeking turning unit 4. After hearing the notification event, the voice direction-seeking turning unit 4 mobilizes the voice direction-seeking unit 3 to synchronously obtain voice signals of the left and right sound channels of the array microphone according to voice location index outputted by the voice activity detection unit 1 first, then calculating a direction-seeking angle by the voice direction-seeking algorithm SO library and outputting the direction-seeking angle to the voice direction-seeking turning unit 4. After obtaining the direction-seeking angle, the voice direction-seeking turning unit 4 mobilizes a power system to turn the main interface of the robot to the user, such that the microphone array is pointed at the user who is talking.

Figure 2:
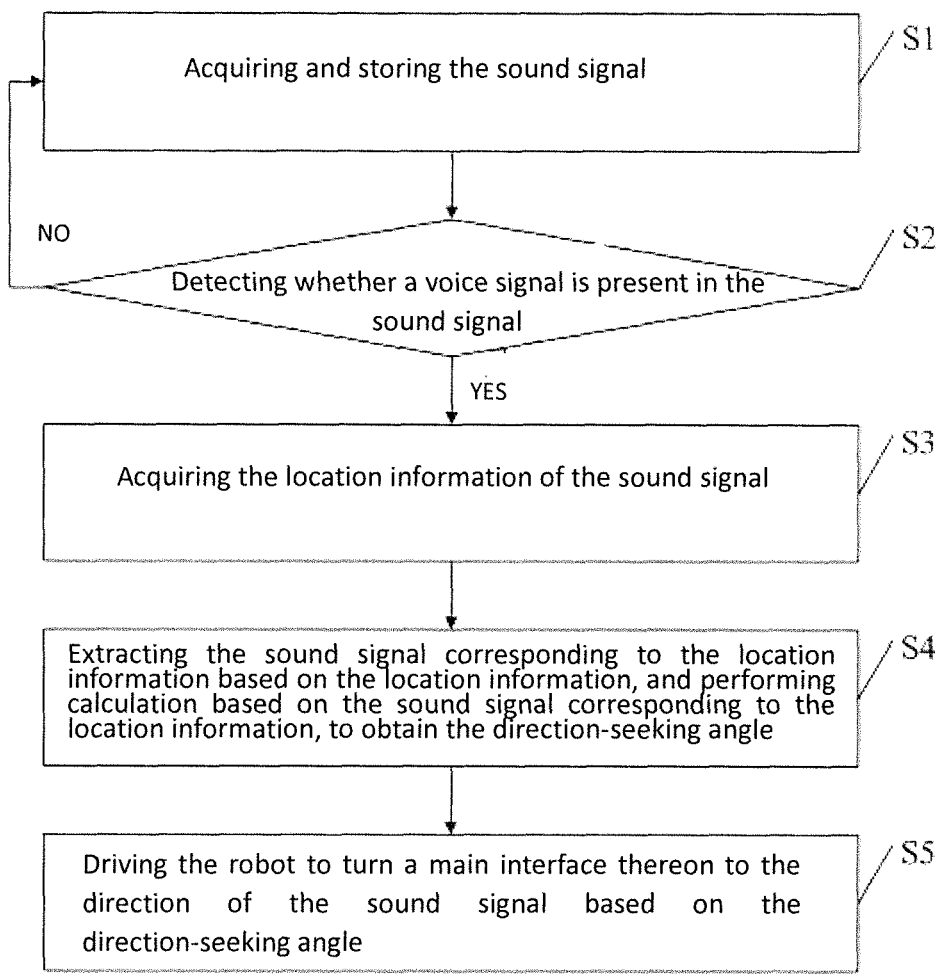

As shown in FIG. 2, a robot voice direction-seeking turning method, applicable to the robot voice direction-seeking turning system, comprising the following steps of:

S1. acquiring and storing the sound signal;

S2. detecting whether a voice signal is present, in the sound signal, if yes, executing Step S3, if not, executing Step S1;

S3. acquiring the location information of the sound signal;

S4. extracting the sound signal corresponding to the location information based on the location information, and performing calculation based on the sound signal corresponding to the location information, to obtain the direction-seeking angle;

S5. driving the robot to turn a main interface thereon to the direction of the sound signal based on the direction-seeking angle.

The present embodiment provides a robot voice direction-seeking turning method, which achieves the positioning of a user who is talking, and then turns the main interface of the robot, to make the microphone array point at the user who is talking. This method allows accurate acquisition of a valid voice signal transmitted by the user, thus increasing signal-to-noise ratio and the accuracy of voice recognition.

The above descriptions are only the preferred embodiments of the invention, not thus limiting the embodiments and scope of the invention. Those skilled in the art should be able to realize that the schemes obtained from the content of specification and drawings of the invention are within the scope of the invention.

What is claimed is:

1. A robot voice direction-seeking turning system, comprising:

a voice acquisition unit, for collecting a sound signal and store the collected sound signal;

a voice activity detection unit, connecting to the voice acquisition unit, for detecting whether a voice signal is present in the sound signal, and outputting the detection result;

a voice direction-seeking turning unit, connecting to the voice activity detection unit, when the detection result indicating that the voice signal is present in the sound signal, controlling the voice acquisition unit to obtain location information corresponding to the sound signal, and outputting the location information; and
a voice direction-seeking unit, connecting to the voice acquisition unit and the voice direction-seeking turning unit respectively, for extracting the sound signal corresponding to the location information based on the location information, and performing calculation based on the sound signal corresponding to the location information, to obtain a direction-seeking angle, and outputting the direction-seeking angle;
wherein, the voice direction-seeking turning unit comprises:
a receiving module, for receiving the detection result, the location information and the direction-seeking angle;
wherein, when the detection result indicates that the voice signal is present in the sound signal, controlling the voice acquisition unit to obtain the location information of the sound signal, and sending the location information to the voice direction-seeking unit, then obtaining the direction-seeking angle through the voice direction-seeking unit; and
a execution unit, connecting to the receiving module, for driving the robot to turn a main interface thereon to a direction of the sound signal based on the direction-seeking angle.

2. The robot voice direction-seeking turning system of claim 1, wherein: the voice acquisition unit comprises: an acquisition device, a recording module and a storage module;
wherein, the acquisition device is configured to collect the sound signal, and output the sound signal;
wherein, the recoding module is connecting to the acquisition device and the storage module respectively, for storing the collected sound signal in the storage module.

3. The robot voice direction-seeking turning system of claim 2, wherein: the voice acquisition unit further comprises:
a sound channel mixing module, connecting to the acquisition device, for mixing a left sound channel signal with a right sound channel signal in the sound signal to generate a mixed sound information, and outputting the mixed sound information.

4. The robot voice direction-seeking turning system of claim 2, wherein: an array microphone is adopted as the acquisition device for converting a picked-up analog voice signal into a digital sound signal, and outputting the digital sound signal.

5. The robot voice direction-seeking turning system of claim 1, wherein: the voice direction-seeking unit comprises:
an acquisition module, for acquiring the left sound channel signal and the right sound channel signal of the sound signal from the voice acquisition unit based on the location information, the sound signal being corresponding to the location information.

6. The robot voice direction-seeking turning system of claim 5, wherein: the voice direction-seeking unit further comprises:

a direction-seeking processing module, connecting to the acquisition module, for performing calculation based on the left sound channel signal and right sound channel signal in the sound signal to obtain the direction-seeking angle in the direction of the sound source.

7. A robot voice direction-seeking turning method, applicable to a robot voice direction-seeking turning system,
wherein robot voice direction-seeking turning system comprises:
a voice acquisition unit, for collecting a sound signal and store the collected sound signal;
a voice activity detection unit, connecting to the voice acquisition unit, for detecting whether a voice signal is present in the sound signal, and outputting the detection result;
a voice direction-seeking turning unit, connecting to the voice activity detection unit, when the detection result indicating that the voice signal is present in the sound signal, controlling the voice acquisition unit to obtain location information corresponding to the sound signal, and outputting the location information; and
a voice direction-seeking unit, connecting to the voice acquisition unit and the voice direction-seeking turning unit respectively, for extracting the sound signal corresponding to the location information based on the location information, and performing calculation based on the sound signal corresponding to the location information, to obtain a direction-seeking angle, and outputting the direction-seeking angle;
wherein, the voice direction-seeking turning unit comprises:
a receiving module, for receiving the detection result, the location information and the direction-seeking angle;
wherein, when the detection result indicates that the voice signal is present in the sound signal, controlling the voice acquisition unit to obtain the location information of the sound signal, and sending the location information to the voice direction-seeking unit, then obtaining the direction-seeking angle through the voice direction-seeking unit; and
a execution unit, connecting to the receiving module, for driving the robot to turn a main interface thereon to a direction of the sound signal based on the direction-seeking angle; wherein the robot voice direction-seeking turning method comprises: comprising the following steps of:
S1. acquiring and storing the sound signal;
S2. detecting whether a voice signal is present in the sound signal, if yes, executing Step S3, if not, executing Step S1;
S3. acquiring the location information of the sound signal;
S4. extracting the sound signal corresponding to the location information based on the location information, and performing calculation based on the sound signal corresponding to the location information, to obtain the direction-seeking angle;
S5. driving the robot to turn a main interface thereon to the direction of the sound signal based on the direction-seeking angle.

* * * * *